Nov. 4, 1969  J. V. DEJOUX  3,476,470

VIEWER FOR ANIMATED STRIPS

Filed Jan. 20, 1967  2 Sheets-Sheet 1

*INVENTOR.*
JEAN VERAN DEJOUX

BY

ATTORNEYS

Nov. 4, 1969  J. V. DEJOUX  3,476,470
VIEWER FOR ANIMATED STRIPS
Filed Jan. 20, 1967  2 Sheets-Sheet 2
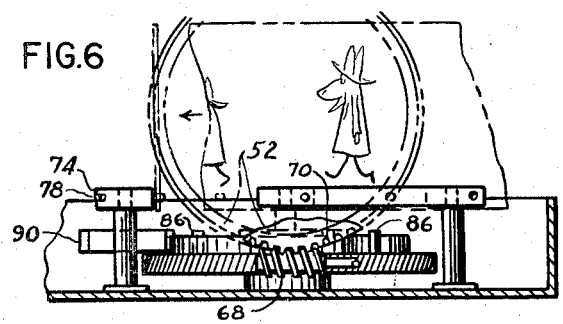
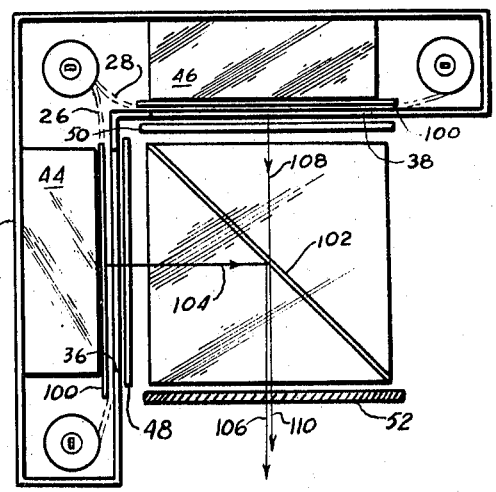
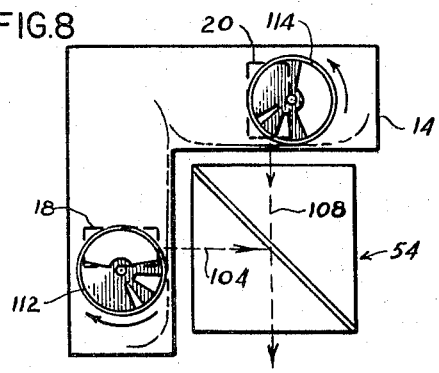
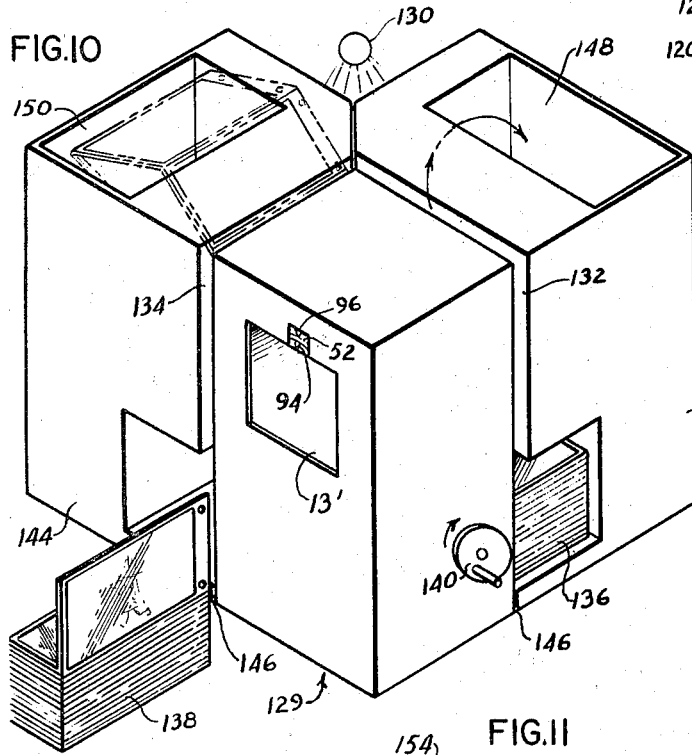
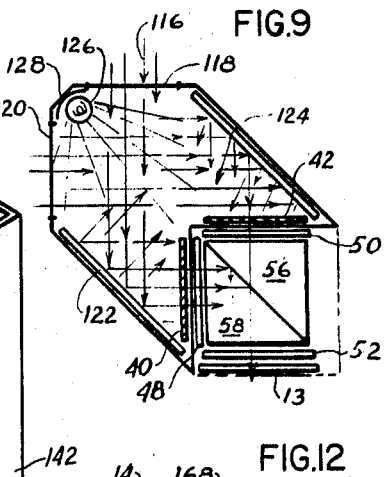
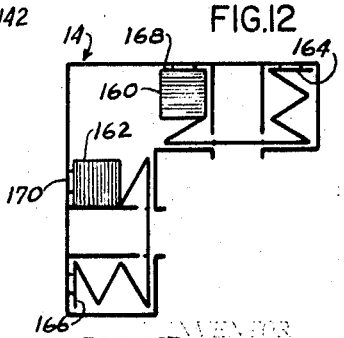
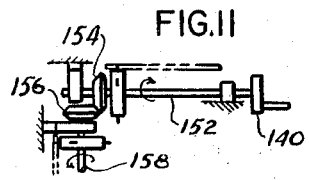
JEAN VERAN DEJOUX
ATTORNEYS United States Patent Office 3,476,470
Patented Nov. 4, 1969

3,476,470
VIEWER FOR ANIMATED STRIPS
Jean Veran Dejoux, Paris, France, assignor to
Nicolas Reisini, New York, N.Y.
Filed Jan. 20, 1967, Ser. No. 610,537
Int. Cl. G03b 41/00, 21/36, 21/10
U.S. Cl. 352—68    9 Claims

ABSTRACT OF THE DISCLOSURE

In a viewer, alternate frames of a motion picture are respectively on two strips. Drive means is operable to move the strips intermittently and sequentially across respectively on two strips. Drive means is operable to viewing screen in superposed relation. Means (a combination of fixed and rotating polarized screens or variable density shutters) for controlling the intensity of the images projected on the screen from the frames of the respective strips are synchronized to increase the intensity of the image from one strip from zero to full intensity and to simultaneously decrease the intensity of the image from the other strip from full to zero intensity. And the drive means is synchronized to move the strip that has a frame image at zero intensity so as to move the next frame on that strip into position relative to its light source while said frame image is at zero intensity.

This invention relates generally to motion pictures and, more particularly, relates to an improved small viewer including an improved system for projection of animated strips.

Hand-held viewers for slides and for viewing individual frames of film strips are, of course, known to the art.

However, viewers for animation, e.g. viewing of a series of frames in sequence to provide an illusion of movement, have not been provided in practical and small forms, but has been restricted to relatively bulky film projectors. One of the primary reasons precluding small portable or hand-held viewing of animated strips has been the need to use relatively long lengths of film strip to provide the desired viewing time with present projection systems running film at a high frame rate.

It is, therefore, an object of the present invention to provide a compact light weight viewer for viewing animations on relatively short strips advanced at a lower frame rate without image deterioration.

Additionally, for many purposes, the cost of production of the strips has been so high as to preclude widespread utilization of hand-held viewers.

It is, therefore, another object of the present invention to provide an improved viewer utilizing inexpensive strips for animated sequences.

For use of such viewers by children, it is, of course, desirable that the viewer be both inexpensive and easy to load and operate.

It is, therefore, another object of the present invention to provide a viewer which can use cartridges to facilitate loading and utilization of the viewer.

In accordance with these objects, there is provided, in a preferred embodiment of this invention, a viewer comprising a viewer body having a viewing screen positioned in one wall thereof. A first and second light aperture is provided in other portions of the viewer body to receive light incident thereupon. The animated sequence is reproduced by a first and second strip with the odd number frames being reproduced in sequence on one strip, and the even number frames being reproduced in sequence on the second strip. The first strip is positioned in front of the first light aperture and the second strip is positioned in front of the second light aperture. Means are provided to direct the illumination incident upon the viewer through said first and second light aperture, the frames respectively aligned with such aperture, and upon the viewing screen. Means are also provided simultaneously to decrease the percentage of illumination arriving at the screen via the one aperture and increasing the light reaching the screen via the other aperture so as to maintain the light incident on the screen substantially constant as one frame is faded out and the other is faded in. At the completion of fading out of one frame, means are provided rapidly to transport the frame from its position of alignment with the light aperture and to position the next adjacent frame in the strip in alignment with the aperture. The process is repeated until the end of both strips, thereby to provide an animated pictorial representation on the screen. Thus, mechanical shutters are unnecessary and the strip advancement mechanism operates in intermittent fashion without shutter assemblies. The strips may be accordion folded printed paper stock or paper or film contained in rolls. Preferably, the animation strips are contained in cartridges for ease of use, particularly by children.

Having briefly described this invention, it will be described in greater detail along with other objects and advantages, in the following portions of the specification, which may best be understood by reference to the accompanying drawings, of which:

FIG. 6 is a sectioned view taken along lines 6—6 of FIG. 3;

FIG. 7 is a sectioned top view of the viewer shown in FIG. 1;

FIG. 8 is a partially sectioned top view of a viewed constructed in accordance with another embodiment of the present invention;

FIG. 9 is a partially schematic view of still another embodiment of a viewer in accordance with the present invention;

FIG. 10 is a perspective view of a viewer particularly adapted for use of accordion folded paper strips;

FIG. 11 is a schematic diagram of the drive mechanism used in FIG. 10; and

FIG. 12 is a schematic showing of a cartridge for accordion folded paper strips useful in connection with viewers of FIG. 1.

Figure 1:
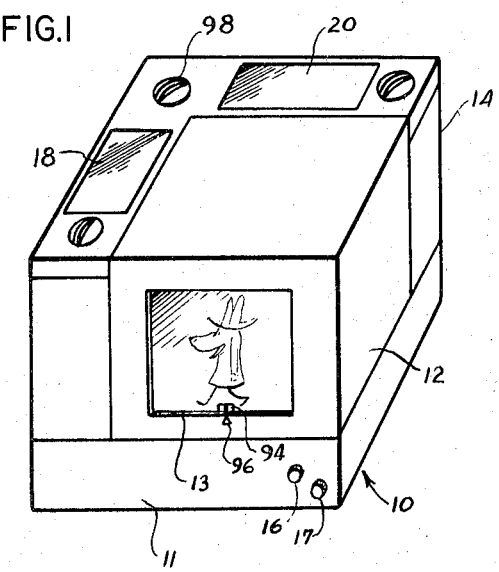
FIG. 1 is a perspective view of a typical viewer constructed in accordance with the present invention.

In FIG. 1, there is shown a viewer constructed in accordance with the present invention which comprises a viewer body 10 having a base section 11 and a viewer section 12 having a viewing screen 13 in one wall thereof. A cartridge 14 contains the animated sequence to be projected on the viewing screen 13. The viewer is designed to be relatively small and can simualte a miniature television set. Knobs 16 and 17 are placed on the front to further the simulation of a television receiver. Knob 16 may be a push button to energize the viewer and knob 17 may be used for alignment purposes as will be explained hereinafter. The viewer utilizes the incident illumination for projection of the animated scene upon the screen 13. To receive the incident illumination, a first window 18 and a second window 20 is provided in the cartridge or casette. It is usually preferred that the apertures be positioned so that they will be directed at the same light source, thereby to maintain the incident illumination on both windows 18 and 20 the same.

Figure 2:
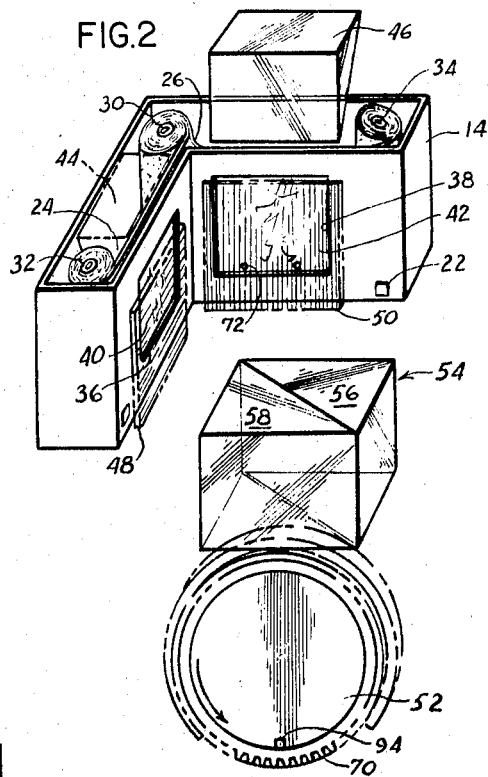
FIG. 2 is a partial, exploded view of the viewer shown in FIG. 1 useful in explanation of the viewer optics.
Figure 3:
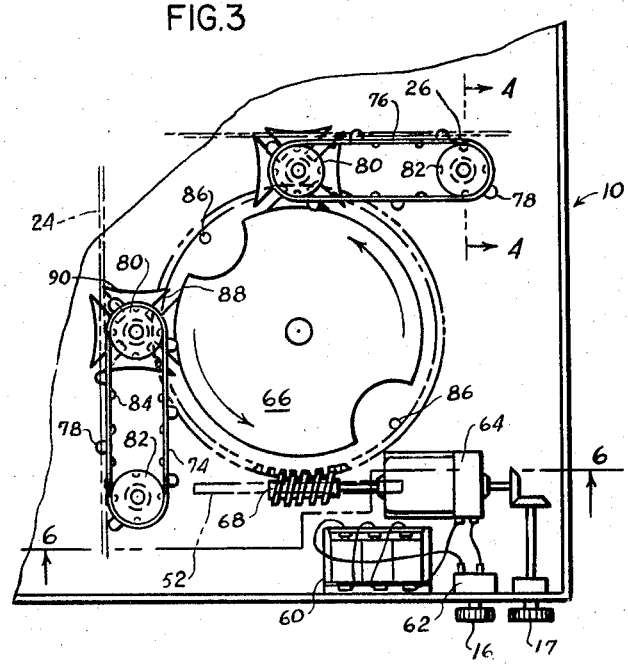
FIG. 3 is a partially broken away perspective view of the drive mechanism used in the view of FIG. 1.
Figure 4:
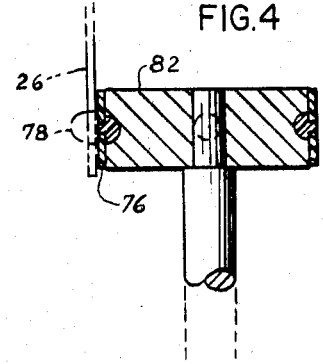
FIG. 4 is a cross section view taken along lines 4—4 of FIG. 3.
Figure 5:
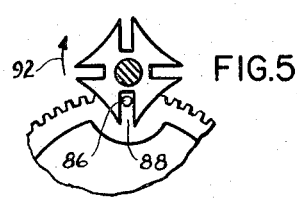
FIG. 5 is a detailed view of a portion of the apparatus shown in FIG. 3.

The optical path is best explained by reference to FIG. 2 which the cartridge 14 with the top removed. The cartridge is preferably secured to the body of the viewer by means of small magnets 22 inserted in the cartridge wall. If the viewer body is metallic, the attractive force will be enough to hold the cartridge in place. If the viewer body is nonmetallic, corresponding metallic inserts must be positioned in the body.

The film system is a dual strip system consisting of a first strip 24 and a second strip 26. The frames of the animated sequence is alternated on the strips. Thus, for example, the strip 24 may contain in sequence the odd frames of the animated sequence with strip 26 containing the even numbered frames of the animated sequence. In the embodiment shown, the strips are interleaved and wound on a single feed spool 30 and are fed to takeup spools 32 and 34 respectively. The strips 24 and 26 are guided in going from the storage spool to the takeup spool past a first light aperture 36 and a second light aperture 38 respectively. The light apertures 36 and 38 are provided to illuminate the respective frames 40 and 42. Means are provided to direct the light incident upon the windows 18 and 20 to the apertures 36 and 38 respectively. In the embodiment shown, this means can consist of prisms 44 and 46 respectively. A similar purpose can be served by reflective mirrors. A polarized screen is positioned in front of the viewing aperture and preferably inserted within the lip thereof. The polarized screen 48 is associated with the first aperture 36 and polarized screen 50 is associated with aperture 38. The polarized screens 48 and 50 are arranged so that the plane of polarization is at right angles as, for example, by having the plane of polarization of screen 48 horizontal as indicated and the plane of polarization of screen 50 vertical. Thus, the light incident upon the viewer is transmitted through the frames in alignment with the apertures 36 and 38 with equal intensity. However, the light so transmitted is polarized so that the planes of polarization of the frames are at right angles one to the other. Optical means are provided to transmit the projected images with equal intensity through a rotating polarized screen 52 and then upon the viewing screen 13. As shown, the optical means 54 may consist of matched prisms 56 and 58 so that the frame aligned with aperture 36 will be reflected from the interface through screen 52 and onto the viewing screen 13. The frame in alignment with aperture 38 will be transmitted through the interface through screen 52 and onto screen 13. The use of abutted prisms permit easy adjustment of the transmission losses.

The screen 52 is mounted for rotation. Thus, as screen 52 rotates, the relative intensity of the image on screen 13 is maintained at substantially equal intensity although the relative contributions from the superimposed frames will depend upon the relationship between the plane of polarization of screen 52 with respect to the initial polarization of the frame. For example, if the first frame in the animated sequence is aligned with aperture 36 and the screen 52 is so positioned as to coincide with a horizontal plane of polarization, the image on screen 13 will consist almost essentially of the image on frame 40, the image from frame 42 being substantially blocked because of the cross axis of the polarized screens. The second frame of the sequence is aligned with aperture 38. As the polarized screen 52 is rotated, the image from frame 40 will be decreased in intensity and the image from frame 42 will be increased in intensity. The total intensity as screen 52 rotates will remain substantially the same however. Ultimately, the image from the first frame 40 is faded out coincidentally with fading in of the image from the second frame in the sequence 42. At the time when frame 40 is faded out, the frame is shifted out of alignment and the third frame of the sequence is brought into alignment with the aperture 36. The process is then repeated sequentially. By this system of projection, as more fully explained in U.S. Patent No. 3,292,990, a realistic simulation of an animated scene can be otbained at relatively low frame advance rates such as 4 frames per second.

The drive mechanism for frame advancement is best illustrated in FIGS. 3–7.

In FIGS. 3–7, there is shown the viewer body 10 within the base of which is mounted a battery pack 60 which consists of a series of cells serially coupled through switch 62 to a drive motor 64. The drive motor drives plate 66 through a worm gear 68. The worm gear 68 also drives the polarized screen by engagement with the teeth 70 on the periphery thereof. The strips 24 and 26 are provided with sprocket holes 72 in the base thereof which are engaged respectively by the drive belts 74, 76. Each belt drive is similar and carries a plurality of projecting sprockets 78 to engage the strip. The belt is wound about a drive capstan 80 and an idler capstan 82 and has lugs 84 engaging the capstans to prevent slippage and to ensure alignment. As noted from the explanation of the operation of the viewer in connection with FIG. 2, the drive of the strips must be intermittent and sequential. Plate 66 controls this operation by the pins 86 which engage the follower slots 88 of the maltese cross drive 90 coupled to the drive capstan 80. Thus, rotation of the plate 66 does not advance either strip until the pin engages a follower slot on the maltese cross drive, causing rotation of the maltese cross drive arrangement in the direction illustrated by arrow 92 in FIG. 5. The dimensioning of the plate 66 and the maltese cross drive is arranged to provide displacement of exactly one frame of one strip. Continued rotation will then cause advancement of the frame of the other strip 26 in similar fashion. Thus, a typical operation of the viewer would be to project frame 1 of the sequence from strip 26 upon screen 13, fading out frame 1, and increasing the intensity of frame 2 simultaneously until frame 2 is projected with full intensity and frame 1 with substantially zero intensity. At this time, strip 26 is advanced to align frame 3 of the sequence with aperture 36 and to begin fading out frame 2 and fading in frame 3. This alternate cycling is repeated until the end of the strip. Since the advancement of the frame must be coordinated with the relative orientation of the polarized screen 52 to permit frame movement only when that frame is substantially blanked out, a hand operated drive wheel 17 is provided for manual rotation of the entire drive assembly. An index mark 94 is provided on the polarized screen which is visible and which is brought into alignment with a pointer 96 on the case before loading the cartridge onto the viewer. In this way, the cartridge is always positioned upon the viewer in such manner that it can be operated in proper sequence. Rewinding of the strips can be done manually by the rewind knob 98 of FIG. 1. To provide for takeup, the takeup spools are preferably spring loaded and the rewind spool provided with a locking position until the cartridge is loaded.

As is shown in FIG. 7, the frames are preferably provided with strip guides 100 to hold the respective strips 26 and 28 in engagement with the apertures 36 and 38. The optical paths are also illustrated in FIG. 7, whereby the image from strip 26 is reflected from the interface 102 as illustrated by arrows 104 and 106 whereas the image from strip 28 is transmited through the interface as illustrated by arrows 108 and 110. It will be noted that the frames are accurately superimposed, the arrow displacements in the illustration being made for the purpose of clarity of illustration.

In the embodiments illustrated, fading in and fading out of the alternate frames has been accomplished by the rotating polarized screen and the crossed polarized screens positioned in front of each frame. It should be noted that it is preferable to locate the polarized screens in front of each frame so that the light is transmitted through the frame and then is polarized. Polarizing the light prior to transmittal through the frames operates satisfactory when the frame material does not diffuse the light as, for example, when it is a frame of photographic film. However, the strips are very conveniently made up of paper strips with the characters printed thereon for economy and manufacture. The paper tends to diffuse the prepolarized light thereby adversely influencing the polarization and limiting the degree of fade in and fade out possible. However, in many applications, the process of fading in and fading out of the respective sequential frames can be accomplished mechanically by control of the light impinging upon the frame. A typical embodiment is illustrated in FIG. 8.

In FIG. 8, there is shown a strip cartridge 14 having light windows 18 and 20 for the reception of incident light impinging thereon. As explained in connection with the operation of the embodiment shown in FIG. 1, the impinging light is directed through the respective frames, as illustrated by lines 104 and 108. The prism arrangement 54 casts the frame images upon a screen in superimposed relationship. In this embodiment, the polarizing screens are omitted and the rotating polarizing screen is omitted. However, a variable density shutter 112 and 114 is provided over the light windows 18 and 20 respectively. As the shutters rotate, the light impinging upon the windows 18 and 20 are controlled to cause a gradual fading of the illumination upon the screen due to the contribution of the image on the frame associated with window 18 with simultaneous increase in the illumination contribution from the frame illuminated by window 20. The shutters 112 and 114 may be entirely mechanical in nature controlling the incident light by the width of open apertures or may be variable density discs having a varying light transmission with radial displacement.

Although the discussion of the embodiments illustrated thus far have been directed at the use of incident illumination because of the desire to maintain the cost and the constructional complexity at a minimum, in those applications where it is desired to ensure operation under conditions of low incident illumination, the embodiment shown in FIG. 9 may advantageously be employed.

In FIG. 9, there is shown a viewer 116 for the controlled display of the image of the frames 40 and 42 upon a viewing screen 13. The frames 40 and 42 are carried upon strips as with the embodiment of FIG. 1. However, unlike the embodiment of FIG. 1, the strips are run vertically, the reasons for which will become apparent hereinafter. As with the embodiment of FIG. 1, polarized screens 48 and 50 are provided before frame 40 and 42 respectively.

Similarly, a rotating polarized screen 52 is provided to accomplish the fade in and fade out sequencing in manner already explained. The windows for admission of light are provided in the rear of the housing. In the embodiment shown, windows 118 and 120 are provided to admit the ambient light which is reflected by mirrors 122, 124 respectively to pass through frames 40 and 42 respectively. In this construction, the viewer housing is held so that the windows are positioned against the light source which is oftentimes a more convenient structure for indoor viewing than the structure of FIG. 1. The primary reason for selecting one housing vs. the other housing will depend on the application intended, namely, whether the ambient illumination is directed vertically downwardly or in a horizontal manner as from a table lamp. To provide means for using the viewer under conditions of low incident illumination, a light source 126 preferably provided with a reflector 128 is provided at the juncture of the windows. In this manner, the light source reflected from mirrors 122 and 124 respectively illuminate frames 40 and 42 respectively with substantially equal intensities. In this type of projection system, the highly desirable results are obtained of an illusion of animation at low frame rates because, among other things, there is a complete absence of flicker. Thus, in positioning a light source, it is desirable to provide equal illumination of each frame. Therefore, a single light source positioned to illuminate both frames is usually preferred over separate illumination of the individual frames.

As previously mentioned, the viewer and projection system of the present invention is admirably suited to the projection of animations imprinted on paper stock. Printing on paper stock is, of course, very much more economical than providing film based animated strips and, thus, the viewer can be utilized as a children's toy with relatively inexpensive replacement animations. When paper stock is employed, it is often desirable to use the strip folded in accordion fashion. With an accordion fold, the paper strip can be compressed to a very small package, facilitating distribution. In addition, other distribution techniques such as printing animated paper strips in newspapers can be used and the child can cut the strips and fold them far more easily than he can load them in a casette or spool. A typical viewer using accordion folded strips is shown in FIG. 10.

In FIG. 10, there is shown the viewer body 129 having a viewing screen 13'. The viewer body is provided with windows in the rear of the body which receive the illumination from the light source 130 which may be ambient light or a bulb source. The light is directed through the frames positioned in the frame slots 132 and 134 and is projected on screen 13'. The optical mechanism is the same as that illustrated in FIG. 9 using a stationary polarized screen for each frame and a rotating polarized screen positioned just before the viewing screen 13. The advancement mechanism is an intermittent advancement mechanism similar to that shown in FIGS. 3–6 but is adapted to produce a vertical movement of the accordion folded paper strips 136, 138 respectively. In order to ensure that the advancement of the frames is properly coordinated with the rotation of the polarized screen to give the proper animation, the polarized screen 52 is provided with an index mark 94 and which is aligned with the pointer 96 on the housing to show the loading position. It is often preferred that a hand drive wheel 140 be provided for manual alignment of the mark 94 with the pointer 96. When so aligned, the packages of accordion folded strips may be inserted with the first frame extended upwardly into slots 132 and 134 respectively. This will permit engagement of the frame by the sprockets on the drive belts. To make sure that the strips are not reversed, it is usually desirable to color code the edge of the strip or the edge of the first frame thereof with a similar color coding of the edge of the slots 132 and 134. To enable the strip to be inserted and then engaged by the sprockets, I have found it advantageous to append the strip receiving mechanisms 142 and 144 to the housing 128 by means of pivots 146. The pivots provide for limited displacement so that the assembly 142 and 144 are tilted out, the strip inserted so that the holes therein engage the sprockets and then the mechanisms 142 and 144 are returned to their operating position. It is usually also advantageous to spring load the pivots 146 to hold the mechanisms in their operating position. In the simplest form illustrated, the mechanisms 142 and 144 are merely provided with hollow receptacles 148, 150 respectively. As the strips 136, 138 are advanced during viewing, they will fold over due to the natural resiliency of the paper stock and nest into the open receptacles 148 and 150 respectively, as illustrated. The strips must then be manually removed from the receptacles.

The advancement mechanism is illustrated in detail in FIG. 11 and comprises the hand wheel 140, a shaft 152, bevel gears 154, 156 to rotate a central shaft 158 which may be, for example, an extension of the motor shaft if motor operation is provided. In its simplest form, hand operation may be provided alone and the battery source and motor omitted.

Cartridges are often preferred but may also be so designed as to employ the more economically fabricated accordion folded paper strip. A typical cartridge is shown in FIG. 12 in schematic form.

In FIG. 12, there is shown a cartridge 14 using accordion folded paper strips 160 and 162. The first frame 164, 166 of strips 160 and 162 are secured to the wall of the housing after the strip has been led past the viewing apertures. Similarly, the last frame 168, 170 of strips 160, 162 are secured to the housing wall. Thus, the cartridge may be assembled to a viewer such as the viewer shown in FIG. 1 and operated. The strips 160, 162 will be transported and stacked in the receptacle portion of the cartridge body. To return the strips to their original position, the viewer motor is merely reversed. At each end of the strip, the securement of the last frame to the viewer body stops frame advancement holding the strip in position for operation, thereby to prevent the need for opening the cartridge for rewinding or repositioning of the accordion strip.

This invention may be variously modified and embodied within the scope of the subjoined claims.

What is claimed is:

1. A viewer for animated strips using two strips, one of which contains the odd numbered frames in the animated sequence and the other of which contains the even numbered frames in the animated sequence said viewer comprising a viewing screen, a first and second window to receive illumination incident upon said viewer, a first and second aperture with which the frames of said first and second strips are respectively aligned, optical means for directing the light admitted through said first and second window onto said first and second aligned frames respectively and to project the illuminated image of said frame upon said screen in superimposed relationship, means to simultaneously decrease the contribution of one of said projected frames from a maximum to substantially zero and simultaneously to increase the contribution of the projection of the next adjacent frame from substantially zero to a maximum so that the total illumination of said screen remains substantially constant throughout, a first drive belt associated with said first strip, a second drive belt associated with said second strip, said first and second drive belt respectively capstaned on a first and second maltese cross drive assembly, a rotatable plate having pins positioned at 180° intervals, and drive means for rotating said plate, said maltese crosses being positioned at 90° around the periphery of said plate and being sequentially engaged by said pins for advancing said strips in intermittent alternate sequence when the illumination incident upon a frame in said strip is reduced to substantially zero.

2. A viewer in accordance with claim 1 which includes means for selectively illuminating each of said frames from a light source positioned within said body.

3. A viewer in accordance with claim 1 in which said means for controlling the relative contribution of said first and second frames comprises a first polarized screen mounted in front of said first frame with the plane of polarization disposed in the horizontal plane, a second polarized screen positioned in front of said second frame with the plane of polarization in the vertical plane, and a rotating polarized screen positioned behind said viewing screen and continuously rotated to change the relative contribution of projection from said first and second frame without substantially changing the total illumination incident upon said viewing screen.

4. A viewer in accordance with claim 3 which includes a drive motor for driving said intermittent frame advancing mechanism, said drive motor being coupled to said polarized screen for rotation thereof in synchronism with said frame advancing mechanism.

5. A viewer in accordance with claim 1 in which said means for adjusting the relative contribution of said frames comprises rotating variable density shutters over said windows, said rotating variable density shutters being driven in synchronism with said strip advancing mechanism.

6. A viewer in accordance with claim 1 in which said first and second strips comprises a paper strip imprinted with the frame contents thereon, said strips being folded in accordion fashion between frames.

7. A viewer for animated strips, one of which contains the odd numbered frames in the animated sequence and the other of which contains the even numbered frames in the animated sequence, said viewer comprising a viewing screen, a first and second window to receive illumination incident upon said viewer, a first and second aperture with which the frames of said first and second strips are respectively aligned, optical means for directing the light admitted through said first and second window onto said first and second aligned frames respectively and to project the illuminated image of said frame upon said screen in superimposed relationship, means to simultaneously decrease the contribution of one of said projected frames from a maximum to substantially zero and simultaneously to increase the contribution of the projection of the next adjacent frame from substantially zero to a maximum so that the total illumination of said screen remains substantially constant throughout, a drive motor and a power source therefor, a first drive belt associated with said first strip, a second drive belt associated with said second strip, said first and second drive belt respectively capstaned on a first and second maltese cross drive assembly, said drive motor engaging a plate having pins positioned at 180° intervals, said Maltese crosses being positioned at 90° around the periphery of said plate and being sequentially engaged by said pins to provide intermittent advance of said strips in alternate sequence when the illumination incident upon a frame in said strip is reduced to substantially zero.

8. A viewer for animated strips using two strips, one of which contains the odd numbered frames in the animated sequence and the other of which contains the even numbered frames in the animated sequence, said viewer comprising a viewer body and a cartridge removably secured to said body, said strips being carried in the cartridge, said cartridge comprising a first and second container portion positioned at 90° with respect to the other container portion said first strip travelling through said first portion from a feed spool to a takeup spool, said second strip positioned within said second portion and moving from a feed spool to takeup spool, a viewing screen, a first and second window to receive illumination incident upon said viewer, a first and second aperture with which the frames of said first and second strips are respectively aligned, optical means for directing the light admitted through said first and second window onto said first and second aligned frames respectively and to project the illuminated image of said frame upon said screen in superimposed relationship, means to simultaneously decrease the contribution of one of said projected frames from a maximum to substantially zero and simultaneously to increase the contribution of the projection of the next adjacent frame from substantially zero to a maximum so that the total illumination of said screen remains substantially constant throughout, and an intermittent drive means associated with each of said strips to advance said strips when the illumination incident upon a frame in said strip is reduced to substantially zero.

9. A viewer in accordance with claim 8 in which each of said strips in said cartridge comprises a paper strip having the frames printed thereon, and positioned within said cartridge in an accordion folded package.

References Cited

UNITED STATES PATENTS

| | | | |
|---|---|---|---|
| 922,302 | 5/1909 | Lumiere | 352—68 |
| 3,029,683 | 4/1962 | Zaromb. | |
| 3,143,920 | 8/1964 | Hawkins | 352—104 |
| 3,159,077 | 12/1964 | Hoag et al. | |
| 3,305,295 | 2/1967 | De Montremy | 352—68 |

JULIA E. COINER, Primary Examiner

U.S. Cl. X.R.

352—91, 104, 129